United States Patent [19]

Nakamae et al.

[11] 4,426,421

[45] Jan. 17, 1984

[54] MULTILAYER COMPOSITE SHEET USEFUL AS A SUBSTRATE FOR ARTIFICIAL LEATHER

[75] Inventors: Kenji Nakamae; Tsukasa Shima, both of Nobeoka, Japan

[73] Assignee: Asahi Kasei Kogyo Kabushiki Kaisha, Osaka, Japan

[21] Appl. No.: 362,935

[22] Filed: Mar. 29, 1982

[30] Foreign Application Priority Data

Apr. 3, 1981 [JP] Japan ................................ 56-49285

[51] Int. Cl.$^{3}$ ................................ D06N 3/00

[52] U.S. Cl. ................................ 428/234; 428/252; 428/286; 428/287; 428/300; 428/904

[58] Field of Search ............... 428/234, 252, 286, 287, 428/300, 904

[56] References Cited

U.S. PATENT DOCUMENTS 4,146,663 3/1979 Ikeda et al. .

FOREIGN PATENT DOCUMENTS 1585632 8/1982 United Kingdom .

*Primary Examiner*—Marion McCamish

*Attorney, Agent, or Firm*—Sprung, Horn, Kramer & Woods

[57] ABSTRACT

A multilayer composite sheet useful as a substrate for artificial leather, comprises at least three fibrous layers, namely, a superficial layer (A) consisting of a spun-laid web composed of extremely fine fibers having an average denier of 0.5 or less and three-dimensionally entangled with each other; and intermediate layer (B) consisting of a web of staple fibers having a length of 50 mm or less and entangled together; and a base layer (C) consisting of a woven or knitted fabric, the above-mentioned three fibrous layers being superimposed on each other and combined together in such a manner that a portion of the fibers in each layer penetrates into the adjacent layers and becomes entangled three-dimensionally with the fibers in the adjacent layers.

5 Claims, No Drawings

MULTILAYER COMPOSITE SHEET USEFUL AS A SUBSTRATE FOR ARTIFICIAL LEATHER

FIELD OF THE INVENTION

The present invention relates to a multilayer composite sheet useful as a substrate for an artificial leather. More particularly, the present invention relates to a multilayer composite sheet comprising at least three fibrous layers; that is, an extremely fine fiber layer incorporated in a woven or knitted fabric layer through an intermediate layer consisting of staple fibers, the composite sheet being useful as a substrate for artificial leathers having excellent properties for use as clothing articles.

BACKGROUND OF THE INVENTION

It is highly rational and, therefore, very desirable to produce an artificial leather from a fibrous sheet which has been produced from extremely fine synthetic fibers provided by a direct spinning method. However, this process involves a number of difficulties and, therefore, has never been successful in the actual production of artificial leathers.

Various processes have been attempted for producing a fibrous sheet by direct-spinning extremely fine fibers and by forming a web from the extremely fine fibers. For example, a spun-bond method, a melt-blow method, and a flush-spinning method are three different typical methods for producing an extremely fine fiber sheet.

In Japanese Patent Application Laid-open No. 53-31866 (1978), the inventors of the present invention disclosed an artificial leather in which a substrate comprising a web made from extremely fine fibers provided by a melt-blow method, which web is a typical spun-laid web, and a woven or knitted fabric is impregnated with an elastic polymeric material.

The above-mentioned artificial leather was disadvantageous in the following points.

1. The spun-laid extremely fine fiber web layer is easily peeled from the fabric layer at a relatively small peeling force.

2. The piles consisting of the spun-laid extremely fine fibers and formed on the raised surface of the artificial leather are easily removed from the raised surface so as to result in the undesirable exposure of the elastic polymeric material impregnated in the artificial leather and, sometimes, of the substrate consisting of the woven or knitted fabric in which the elastic polymeric material is impregnated.

3. The impregnation property of the elastic polymeric material into the composite sheet is poor and, sometimes, the impregnation of the elastic polymeric material in the composite sheet is uneven.

SUMMARY OF THE INVENTION

An object of the present invention is to provide a multilayer composite sheet useful as a substrate for artificial leather, in which the component layers are firmly bonded to each other.

Another object of the present invention is to provide a multilayer composite sheet useful as a substrate for artificial leather, in which extremely fine fibers are firmly entangled with each other.

A further object of the present invention is to provide a multilayer composite sheet useful as a substrate for artificial leather, which composite sheet is easily impregnated with an elastic polymeric material.

The above-mentioned objects can be attained by the multilayer composite sheet of the present invention, which comprises at least three fibrous layers, namely, a superficial layer (A) consisting of spun-laid extremely fine fibers having an average denier of 0.5 or less, which fine fibers are entangled with each other, thereby forming a body of a non-woven fibrous layer;

an intermediate layer (B) consisting of synthetic staple fibers having a length of 50 mm or less, which staple fibers are entangled with each other to form a body of a non-woven fibrous layer; and a base layer (C) consisting of a woven or knitted fabric, the superficial layer (A), the intermediate layer (B) and the base layer (C) being superimposed together in the above-mentioned order and incorporated in each other to form a body of a composite sheet in such a manner that a portion of the fibers in each non-woven fibrous layer penetrate into the adjacent layers and the penetrated fibers become entangled with the fibers in the adjacent layers.

The multilayer composite sheet may be provided with an additional back surface layer (D), consisting of synthetic staple fibers entangled with each other and having a length of 50 mm or less, the back surface layer (D) being placed on the lower surface of the base layer (C) and incorporated into the three fibrous layers (A), (B) and (C) in the same manner as that mentioned above.

DETAILED DESCRIPTION OF THE INVENTION

In the multilayer composite sheet of the present invention, it is important that an intermediate layer (B), consisting of synthetic staple fibers having a length of 50 mm or less, be interposed between a superficial layer (A), consisting of spun-laid extremely fine synthetic fibers having an average denier of 0.5 or less and, usually, a length of 100 mm or more, and a base layer (C), consisting of a woven or knitted fabric. The intermediate layer (B) is extremely effective for firmly bonding the superficial layer (A) with the base layer (C) therethrough. That is, the superficial layer (A) and the intermediate layer (B) are firmly bonded to each other and the intermediate layer (B) and the base layer (C) are firmly bonded together.

The above-mentioned three layer-composite sheet can be prepared by superimposing the superficial layer (A), the intermediate layer (B) and the base layer (C) together in the above-mentioned order and, then, by incorporating them together to form a body of a composite sheet by means of needle-punching or water-stream-ejecting under a high pressure. During the above-mentioned incorporating procedures, the staple fibers in the intermediate layer (B) are easily moved by the action of the needles or the water-streams, which penetrate into the inside of the intermediate layer (B), and the staple fibers easily penetrate into the inside of the superficial layer (A) or the base layer (C) so as to become entangled with the fibers in the superficial layer (A) or the base layer (C). Also, during the incorporating procedure, the fibers in the superficial layer (A) and the base layer (C) easily penetrate into the inside of the intermediate layer (B) so as to become entangled with the fibers in the intermediate layer (B).

Furthermore, the above-mentioned incorporating procedure is extremely effective for promoting the three-dimensional entanglement of the extremely fine fibers with each other in the superficial layer (A).

Accordingly, substantially no separation of the superficial layer (A) from the base layer (C) occurs in the actual use of the composite sheet and the extremely fine fibers in the superficial layer (A) exhibit an excellent resistance to abrasion.

Also, it was found by the inventors of the present invention that the multilayer composite sheet of the present invention exhibits the following unexpected advantages.

1. When the composite sheet of the present invention is converted to an artificial leather by impregnating the composite sheet with an elastic polymeric material and the surface of the artificial leather is raised, the density of the resultant extremely fine piles on the raised surface is significantly larger than that on the conventional raised artificial leathers in which the substrate consists of a conventional composite sheet comprising a spun-laid web layer and a woven or knitted fabric layer but not containing a binder layer consisting of staple fibers. That is, the pile surface of the superficial layer (A) in the composite sheet of the present invention is extremely dense.

2. When the composite sheet of the present invention is impregnated with the elastic polymeric material, the impregnation rate of the polymeric material into the composite sheet, which rate is inversely proportional to the necessary time for bringing the composite sheet into an equilibrium amount of the polymeric material impregnated, is remarkably larger than that of the above-mentioned conventional composite sheet containing no staple fiber layer.

3. When the composite sheet of the present invention is impregnated with the elastic polymeric materials, the distribution of the polymeric material is very even through the composite sheet.

4. When the surface of the artificial leather is raised, the amount of the spun-laid extremely fine fibers removed from the artificial leather is remarkably smaller than that of the above-mentioned conventional artificial leather containing no staple fiber layer.

In the present invention, an extremely fine fiber web usable for forming the superficial layer (A) is prepared by directly spinning extremely fine fibers from a fiber-forming polymeric material, and by collecting and accumulating randomly the spun fine fibers to form a web sheet. The spun-laid extremely fine fibers have an average denier of 0.5 or less and usually, a length of 100 mm or more. The spun-laid extremely fine fibers may be substantially endless.

Usually, the web sheet of the spun-laid extremely fine fibers is in a weight of from 5 to 500 g/m$^2$.

The degree of orientation of the spun-laid extremely fine fibers may be high, as that of drawn fibers, or may be low, like that of usual undrawn fibers. The fibers in the web sheet are randomly accumulated. In the web sheet of the spun-laid extremely fine fibers, it is preferable that the fibers not be fuse-bonded to each other so that the fibers are highly free in relative movement to each other and, therefore, the resultant composite sheet exhibits a proper softness. The high freedom of the fibers in their relative movement to each other is effective for promoting the fibers to easily interlace with each other and to easily penetrate into the intermediate layer (B) so as to entangle with the staple fibers in the intermediate layer (B).

The above-mentioned spun-laid web can be produced by a conventional spun-bond method disclosed, for example, by Japanese Patent Application Publication No. 37-4993 (1962), 45-33876 (1970), 45-10779 (1970), 45-1941 (1970), 46-3314 (1971), or 48-38025 (1973) or U.S. Pat. No. 3,338,92; by a conventional flush-spinning method disclosed, for example, Japanese Patent Application Publication No. 40-28125 (1965), 41-6215 (1966), 43-16651 (1968) or 44-21817 (1969) or U.S. Pat. No. 3,081,519; by a conventional melt-blow method disclosed, for example, by U.S. Pat. No. 3,595,245, 3,615,995 or 3,650,866, Japanese Patent Application Publication No. 42-27599 (1967), 43-26576 (1968), 44-30473 (1969), 43-26577 (1968) or 41-7883 (1966), or Japanese Patent Application Laid-open No. 54-134176 (1979) or 55-90663 (1980); or by a known centrifugal spinning method.

Otherwise, the spun-laid web may be produced by producing extremely fine fibers in accordance with a method disclosed by Japanese Patent Application Laid-open No. 55-26203 (1980) or 55-26201 (1980), without winding the resultant fibers on a core, and, then, by accumulating the extremely fine fibers to form a web sheet.

When the composite sheet of the present invention is used as a substrate of an artificial leather, it is preferable that the spun-laid extremely fine fiber web be produced by the melt-blow method.

In the spun-laid extremely fine fibers, the denier of the individual fibers may be randomly distributed as long as the average denier thereof is 0.5 or less.

In the spun-laid extremely fine fiber web, the extremely fine fibers are randomly entangled three-dimensionally with each other to form a body of a web sheet, and preferably this web sheet has a weight of from 5 to 500 g/m$^2$, more preferably, from 20 to 200 g/m$^2$, and an apparent density of from 0.01 to 0.5 g/cm$^3$, more preferably, from 0.05 to 0.30 g/cm$^3$.

The term "apparent density" used herein refers to $$\frac{\text{Weight of web (g/m}^2)}{\text{Thickness of web (cm).}} \times 10^{-4}$$

The extremely fine fibers usable for the present invention include synthetic fibers, for example, polyester, polyamide, polyacrylonitrile, polyacrylic polymer, polyethylene and polypropylene fibers; regenerated fibers, for example, rayon and cupra; and semi-synthetic fibers, for example, cellulose acetate fibers. The most preferable extremely fine fibers are made of polyethylene terephthalate (PET).

When the composite sheet of the present invention is used as a substrate for artificial leather, the extremely fine fiber web is converted into a superficial layer of the artificial leather. Since the superficial layer consists of extremely fine fibers having an average denier of 0.5 or less and are entangled with each other, the resultant leather exhibits a satisfactory appearance, an excellent writing effect and a superior surface resistance to abrasion, and, therefore, is very useful as a material for clothing.

The staple fiber web for forming the intermediate layer (B) is composed of staple fibers entangled with each other and having a length of 50 mm or less and, preferably, a denier of from 0.01 to 5.0, more preferably, from 0.1 to 3.0. The staple fibers are preferably made from a sythetic polymer, especially, a polyester, such as polyethylene terephthalate (PET), or a polyamide, such as nylon 66 or nylon 6.

The staple fiber web preferably has a weight of from 5 to 500 g/m$^2$, more preferably, from 20 to 200 g/m$^2$, and an apparent density of from 0.01 to 0.5 g/cm$^3$, more preferably, from 0.05 to 0.3 g/cm$^3$.

The staple fibers in the intermediate layer (B) are entangled three dimensionally with each other to form a body of a non-woven fibrous layer and a portion of the staple fibers penetrates into the superficial layer (A) and the base layer (C) and becomes entangled with the fibers in the superficial layer (A) and the base layer (C) so as to firmly bond the superficial layer (A), the intermediate layer (B) and the base layer (C) together to form a body of a composite sheet.

In order to firmly bond the above-mentioned three fibrous layers (A), (B) and (C) together, it is important that the staple fibers in the intermediate layer (B) have a length of 50 mm or less and the intermediate layer (B) be interposed between the superficial layer (A) and the base layer (C). Usually, it is difficult to firmly incorporate a spun-laid extremely fine fiber web into a woven or knitted fabric because of the relatively large length of the extremely fine fibers. However, in the present invention, it became possible to firmly incorporate the spun-laid extremely fine fiber web to the woven or knitted fabric by using the intermediate staple fiber web. Also, it became possible to use the spun-laid extremely fine fiber web in the production of artificial leather.

The base layer (C) is composed of a woven or knitted fabric, for example, a plain stitch fabric, a tricot fabric, a plain weave fabric, a satin fabric or a twill fabric, preferably a plain weave fabric. When the base layer (C) is composed of a plain weave, it is preferable that the plain weave fabric has densities of warps and wefts of from 20 to 80 yarns/inch and a weight of from 10 to 100 g/m$^2$. The woven or knitted fabric usable for the base layer (C) may be composed of any of the multifilament yarns, textured yarns and spun yarns. Preferable yarns for the base layer (C) are multifilament textured yarns. The yarns may be composed of any type of fibers or filaments. However, it is preferable that the base layer (C) exhibit the same dyeing property as that of the superficial layer (A).

The base layer (C) is effective for enhancing the mechanical strength and dimensional stability of the resultant composite sheet. Also, if desired, the base layer (C) can serve to impart a proper stretching property to the composite sheet.

The multilayer composite sheet of the present invention may contain, in addition to the superficial layer (A), the intermediate layer (B) and the base layer (C), a back surface layer (D) placed on the lower surface of the base layer (C). The back surface layer (D) consists of synthetic staple fibers entangled with each other and having a length of 50 mm or less. The back surface layer (D) is incorporated into the composite sheet in such a manner that a portion of the fibers in the back surface layer (D) penetrate into the base layer (C) or into the intermediate layer (B) through the base layer (C) and the penetrated fibers become entangled three dimensionally with the fibers in the base layer (C) or the intermediate layer (B).

The back surface layer (D) is effective for enhancing the appearance of the back surface of the composite sheet.

In the back surface layer (D), it is preferable that the staple fibers have a length of 50 mm or less. When the length is more than 50 mm, the resultant back surface layer (D), sometimes, cannot be firmly incorporated into the base layer (C) and, therefore, is easily separated from the base layer (C).

The staple fibers in the back surface layer (D) are not limited to special types of fibers as long as the length of the fibers does not exceed 50 mm. That is, it is preferable that the staple fibers in the back surface layer (D) have a denier of from 0.01 to 3.0, more preferably, from 0.05 to 0.5. This small denier of the staple fibers is effective for enhancing the appearance of the back surface of the composite sheet. Usually, it is preferable that the staple fibers be polyester fibers, for example, PET fibers, or polyamide fibers, for example, nylon 66 fibers.

Preferably, the back surface layer (D) has a weight of from 20 to 200 g/m$^2$ and an apparent density of from 0.05 to 3.0 g/cm$^3$.

The back surface layer (D) may be the same as the intermediate layer (B) in the type, denier and length of the staple fibers, and in the weight and the apparent density. However, the back surface layer (D) may be different in all or in some of the properties, i.e. type, denier and length, of the staple fibers and also in weight apparent density thereof from the intermediate layer (B), depending on the purpose of using the back surface layer (D).

In the multilayer composite sheet of the present invention, the intermediate layer (B) serves as a binder between the superficial layer (A) and the base layer (C). If the conventional spun-laid web is incorporated with the woven or knitted fabric without using the intermediate staple fiber web so as to form a body of a sheet type, the peeling strength between the spun-laid web and the woven or knitted fabric is usually in the range of from 0.05 to 0.4 kg/cm. In the multilayer composite sheet of the present invention, however, the peeling strengthes, determined by a method which will be described hereinafter, are from 1.5 to 8.0 kg/cm between the superficial layer (A) and the intermediate layer (B) and from 2.0 to 8.0 kg/cm between the intermediate layer (B) and the base layer (C). Sometimes, during the testing procedure for the peeling strengthes, the composite sheet is ruptured without peeling the superficial layer (A) and/or the base layer (C) from the intermediate layer (B).

According to the results of the inventor's research, it is preferable that the peeling strength between the superficial layer (A), the intermediate layer (B) and the base layer (C) be at least 0.5 kg/cm, in order to guarantee that the component layers are not separated from each other while being used. The composite sheet of the present invention can guarantee the non-separation of the component layers from each other while the composite sheet is actually being used.

The multilayer composite sheet of the present invention can be produced by the following process.

The spun-laid web usable for forming the superficial layer (A) can be produced by the afore-mentioned methods. Typically, extremely fine fibers, having an average denier of from 0.005 to 0.3 and an average length of from 100 to 200 mm, are produced from PET, nylon 6, nylon 66 or polyacrylonitrile in accordance with the melt-blow method disclosed in Japanese Patent Application Laid-open No. 54-131080 (1979), and the spun extremely fine fibers are directly accumulated on a perforated conveyer, for example, a screen, to form a spun-laid web having a weight of 10 to 200 g/m$^2$.

In another process, a spun-bond method disclosed in Japanese Patent Application Publication No. 48-38025 (1973), 42-27599 (1967) or 37-4993 (1962), is applied to provide a web having a weight of from 10 to 200 g/m$^2$ and consisting of continuous multifilaments having an average denier of from 0.1 to 0.5. In a further process, a web is produced from extremely fine fibers having an average denier of from 0.001 to 0.3 and an average length of from 100 to 300 mm, which fibers have been prepared by a flush spinning method disclosed in Japanese Patent Application Publication No. 44-21817 (1969). Generally, it is preferable that the spun-laid extremely fine fiber web be produced by the melt-blow method.

The staple fiber web, usable for the intermediate layer (B), can be produced from staple fibers consisting of polyethylene terephthalate, nylon 6, nylon 66 or polyacrylonitrile and having a length of 50 mm or less and, preferably, a denier of from 0.05 to 5, by means of a carding-cross laying method or a paper-forming method. The paper-forming method is most preferable for rationally producing the staple fiber web having an excellent evenness in quality.

In the production of the staple fiber web for the intermediate layer (B), it is preferable to use two or more types of component fibers different in solubility in a certain solvent, for example, water. If the staple fiber web is made from solvent-soluble staple fibers and solvent-insoluble staple fibers, and the resultant composite sheet is used for producing an artificial leather, the solvent-soluble staple fibers can be removed before or after the composite sheet is impregnated with an elastic polymeric material, such as polyurethane. The removal of the solvent-soluble staple fibers is effective for making the resultant artificial leather soft and lightweight.

For example, the staple fiber web may be produced from a mixture of polyvinyl alcohol staple fibers, which are soluble in hot water, and polyethylene terephthalate staple fibers, which are insoluble in hot water.

The woven or knitted fabric for the base layer (C) is prepared, for example, from multifilament yarns consisting of PET, nylon 6 or nylon 66 individual multifilaments having a denier of from 1 to 5, are, optionally, textured and the textured or non-textured multifilament yarns are converted into a plain weave fabric having a weight of from 20 to 100 g/m$^2$ and warp and weft densities of from 20 to 100 yarns/inch. The textured multifilament yarns has an enhanced textured freedom of the individual filaments in relative movement to each other and is effective for promoting the entanglement of the filaments with the fibers in the intermediate layer (B).

The spun-laid extremely fine fiber web, the staple fiber web and the woven or knitted fabric are superimposed on each other in the above-mentioned order to provide a precursory composite sheet. In the preparation of the precursory composite sheet, a staple fiber web of the back surface layer (D) may be superimposed on the lower surface of the woven or knitted fabric.

The staple fiber web of the back surface layer (D) may be the same as or different from the staple fiber web of the intermediate layer (B). When an enhanced appearance is desired on the back surface of the composite sheet, the back surface layer (D) may be composed of a web consisting of extremely fine fibers having a denier of 0.4 or less and a length of 50 mm or less. If it is desired to provide a composite sheet having an enhanced softness, it is preferable that the density of the staple fiber web of the back surface layer (D) be smaller than that of the intermediate layer (B).

The precursory composite sheet is subjected to procedures combining the component fibrous layers to each other. Otherwith, the spun-laid extremely fine fiber web is combined to the staple fiber web and the resultant sheet is combined to the woven or knitted fabric by the combining procedures. The combining procedures may be carried out by the conventional needle-punching method or the water stream-ejecting method under a high pressure. When the precursory composite sheet is subjected to the combining procedures, the water stream-ejecting method under a high pressure is most preferable to produce the multilayer composite sheet of the present invention, because the damage on the component fibrous webs due to the combining procedures is very small and the or entangling density of the fibers to each other is excellent.

For example, a staple fiber web which has a weight of 40 to 120 g/m$^2$ and has been prepared from 50 to 100% by weight of polyethylene terephthalate staple fibers having a denier of from 1 to 5 and a length of 1 to 50 mm and 50 to 0% by weight of polyvinyl alcohol staple fibers having a denier of from 1 to 5 and a length of 1 to 30 mm, by a paper-forming method, was superimposed on a plain weave fabric having a weight of from 20 to 60 g/m$^2$ and consisting of polyethylene terephthalate fibers having a denier of from 1 to 5. Next, a spun-laid web, which has a weight of from 30 to 100 g/m$^2$ and consists of polyethylene terephthalate fibers having an average denier of 0.01 to 0.1 and an average length of from 100 to 200 mm, and prepared by a melt-blow method, was superimposed on the staple fiber web, to provide a precursory three-layer composite sheet. A plurality of water streams were ejected through a plurality of nozzles each being provided with an orifice having a diameter of from 0.1 to 0.5 mm, toward a surface of the precursory composite sheet under a high pressure of from 5 to 30 kg/cm$^2$ while a reduced pressure was produced on the opposite surface of the precursory composite sheet so as to suck the water streams from the surface to the opposite surface of the precursory composite sheet therethrough. Next, the similar water stream-ejecting procedures to those described above were applied to the opposite surface of the precursory composite sheet. The above-mentioned procedures were applied to each surface of the precursory composite sheet several times.

The water-streams caused the fibers in each composite fibrous layer to become entangled three dimensionally with each other and a portion of the fibers penetrated into the other layers and became entangled three dimensionally with the fibers in the other layers, so as to form a composite sheet in which the component fibrous layers were firmly combined with each other.

The multilayer composite sheet may be converted into an artificial leather by using any of the conventional artificial leather-producing methods. Usually, the composite sheet is impregnated with an elastic polymeric material, for example, a rubber-like polymeric material, and the impregnated composite sheet is subjected to raising procedures and/or a dyeing procedures.

The elastic polymer may be selected from polyurethane, synthetic rubbers, such as butadiene-acrylonitrile rubber and butadiene-styrene rubber, elastic polyvinyl chlorides, elastic acrylic polymers, polyaminoacids, and elastic copolymers of two or more monomers of the above-mentioned polymers. The most preferable elastic polymer is a polyurethane. The impregnating procedure may be carried out by any conventional method, for example, an immersion method, a coating method and spraying method. The most preferable impregnating method is the immersion method which is effective for uniformly impregnating the composite sheet with the elastic polymeric material.

In this immersion method, the composite sheet is immersed in a solution of the elastic polymeric material, for example, a polyurethane, in a solvent, the amount of the impregnated elastic polymeric material is regulated to a desired level and, then, the elastic polymeric material is solidified on and in the composite sheet by a dry evaporating method or a wet coagulating method. Usually, the wet coagulating method is preferably used, because with this method the resultant artificial leather exhibits a satisfactory soft touch.

The amount of the elastic polymeric material to be impregnated by the composite sheet is variable depending on the use of the resultant artificial leather and is, preferably, in the range of from 5 to 150% by dry weight, based on the weight of the composite sheet. If it is necessary for the resultant artificial leather to exhibit a soft touch, the amount of the elastic polymeric material to be applied to the composite sheet is preferably in the range of from 5 to 70%, based on the weight of the composite sheet.

Since the mechanical strength of the artificial leather can be increased by using the base layer (C) consisting of the woven or knitted fabric, it is not very important to enhance the mechanical strength of the artificial leather by applying a large amount of the elastic polymeric material to the composite sheet.

After the composite sheet is impregnated with the elastic polymeric material, the artificial leather may be subjected to various finishing procedures.

For example, in order to provide a natural suede-like artificial leather, the superficial layer (A) of the artificial leather is raised by a raising method, for example, an emery paper raising method, card clothing raising method or a brush raising method. Usually, the emery paper raising method is the best for the spun-laid extremely fine fiber superficial layer (A). Usually, the superficial layer (A) is composed of extremely fine fibers having a denier of 0.5 or less, especially, of from 0.01 to 0.1 and prepared by the melt-blow method. Therefore, the emery paper raising procedure results in the formation of a suede-like pile surface layer having a high density of pile fibers and a satisfactory appearance and touch. The appearance of the raised superficial layer can be additionally enhanced by dyeing or by shearing, raising or brushing the pile fibers.

If the artificial layer is required to be provided with a grain surface thereof, the surface of the superficial layer (A) is coated with an elastic polymeric material, such as polyurethane, and, then, if necessary, is additionally coated with a finishing agent, such as a lacquer.

The features and advantages of the present invention are further illustrated by the examples set forth hereinafter, which are not intended to limit the scope of the present invention in any way.

In the following examples and comparison examples, the properties of the composite fabric and the artificial leather were respectively determined in accordance with the following methods.

1. Peeling strength

Six test specimens, each having a length of 15 cm and a width of 2.5 cm, were taken from the composite sheet or artificial leather to be tested. Three test specimens were used for the determination of the peeling strength between the superficial layer (A) and the intermediate layer (B) and the remaining three test specimens were used for the peeling strength between the intermediate layer (B) and the base layer (C).

In the testing procedure, an end portion, having a length of 10 cm, of the specimen was split into two layers. The split end portions were gripped and stretched in opposite directions to each other by using a test machine under the following conditions, until the specimen was broken.

| | |
|---|---|
| Length of the gripped portion of the specimen | 5 cm |
| Stretching rate | 10 cm/min |
| Recording speed on chart in the testing machine | 5 cm/min |

The peeling strength (in kg/cm) is represented by an average value of the three maximum values and the three minumum values indicated on the chart.

When the back surface layer (D) is contained in the composite sheet of the artificial leather to be tested, the peeling strength between the back surface layer (D) and the base layer (C) is determined in the same method as described above.

2. Resistance to abrasion

A surface of a composite sheet or artificial leather to be tested is abraded repeatedly with a Martindale abrasion tester (Model 103 made by James H. Heal Company) until at least a portion of the base layer is exposed to the outside of the composite sheet or artificial leather. The resistance to abrasion of the test specimen is represented by the number of the abrading operations necessary for causing a portion of the base layer to be exposed to the outside of the specimen.

When 10,000 applications or more of the abrading operation do not result in exposure of the base layer to the outside of the specimen, the specimen exhibits a satisfactory resistance to abrasion.

3. Impregnating rate of polyurethane

A specimen is immersed in a solution of 15% by weight of a polyurethane in dimethylformamide, which solution had a viscosity of 10 poises at 25° C., for a predetermined time; the immersed specimen is squeezed so that the specimen is impregnated with 300% of the solution based on the weight of the specimen, the squeezed specimen is immersed in water so as to coagulate the polyurethane; and then, the specimen is dried. The amount of the polyurethane impregnated in the specimen is determined by extracting the polyurethane from the specimen. The above-mentioned procedures are repeated several times with different immersing times.

A relationship between the amount of the polyurethane impregnated in the specimen and the immersing time is determined. From the above-mentioned relationship, an immersing time of the specimen in the polyurethane solution, at which time the amount of the impregnated polyurethane in the specimen reached an equilibrium, is obtained. The impregnating rate of polyurethane is represented by the equilibrium immersing time (seconds).

Example 1

A random fine fiber web A consisting of polyethylene terephthalate (PET) extremely fine fibers having an average denier of 0.01 and an average length of 100 to 150 mm and having a weight of 80 g/m$^2$ was produced in accordance with a melt-blow method disclosed in Japanese Patent Application Laid-open No. 54-131080 (1979).

Separately, a staple fiber web B having a weight of 60 g/m$^2$ was prepared, by means of paper-making, from a mixture of 40 parts by weight of the PET staple fibers, which had a denier of 0.2 and a length of 5 mm and which were produced by a direct spinning method disclosed in Japanese Patent Application Laid-open No. 55-26203 (1980), and 60 parts by weight of polyvinyl alcohol staple fibers having a denier of 1.0 and a length of 5 mm.

Another staple fiber web D was prepared in the same manner as that the staple fiber web B.

A plain weave fabric having a weight of 60 g/m$^2$, a warp density of 60 yarns/inch and a weft density of 60 yarns/inch was prepared from PET multifilament textured yarns having a yarn count of 75 deniers/36 filaments.

The plain weave fabric was interposed between the staple fiber web B and the staple fiber web D which were superimposed on each other, and, then, the random fine fiber web A was placed on the staple fiber web B, to provide a four-layer precursory composite sheet.

The precursory composite sheet was placed on a metal wire net having a mesh size of 80. A number of water streams were ejected to the upper surface (the random fine fiber web A) of the precursory composite sheet through a number of nozzles, each having an orifice having a diameter of 0.2 mm under a high pressure of 20 kg/cm$^2$ while a reduced pressure was maintained on the lower surface side of the wire net. The precursory composite sheet was turned over on the metal wire net, and the same water stream-ejecting procedure as that described above was applied to the lower surface (the staple fiber web D) of the precursory composite sheet, except that the pressure of the ejected water streams was 10 kg/cm$^2$.

Each of the upper and lower surfaces of the precursory composite sheet were subjected four times to the above-mentioned water stream-ejecting procedure. After the water stream-ejecting procedures were completed, the resultant composite sheet was dried. The dried composite sheet had a thickness of 1.20 mm, a weight of 250 g/m$^2$, an apparent density of 0.208 g/cm$^3$, peeling strengthes of 2.5 kg/cm between the random fine fiber web layer A and the staple fiber web layer B, of 2.3 kg/cm between the staple fiber web layer B and the plain weave fabric layer C, and of 2.7 kg/cm between the staple fiber web layer D and the plain weave fabric layer C.

The upper surface (random fine fiber web layer A) of the composite sheet was raised by using a belt sander equipped with a 240 mesh emery paper. The raised composite sheet was immersed in an aqueous solution of 5% by weight of polyvinylalcohol, removed from the aqueous solution, and then, dried. The amount of the polyvinylalcohol picked up by the composite sheet was 15% based on the weight of the composite sheet. The upper surface of the composite sheet was coated with 20 g of carboxymethyl cellulose (CMC) by using a 30% aqueous solution of CMC and a doctor knife.

The composite sheet was impregnated with a solution of 15% by weight of an ether type polyurethane containing, as a polyol component, polytetramethylene glycol in dimethylformamide (DMF). The composite sheet was immersed in a water bath for 10 minutes to coagulate the polyurethane. Next, the composite sheet was immersed in a hot water bath at a temperature of 90° C. to remove the polyvinyl alcohol staple fibers, the impregnated polyvinyl alcohol and the coated CMC, and, then dried.

The amount of the polyurethane contained in the resultant artificial leather was 40% based on the weight of the composite sheet.

The artificial leather was dyed with 10%, based on the weight of the artificial leather, of Disperse Red (Sumikaron Rubine SE-2BL, made by Sumitomo Chemical Co., Ltd.) at a temperature of 130° C. for 60 minutes by using a high pressure dyeing machine, and the dyed artificial leather was reduction-washed with 2 g/l of sodium hydrosulfite.

The washed artificial leather was dried and the upper surface thereof was lightly brushed. The resultant artificial leather exhibited a desirable writing effect and had a weight of 220 g/m$^2$, thickness of 0.75 mm and the properties indicated in Table 1.

Comparative Example 1

A three layer precursory composite sheet was prepared by interposing the same plain weave fabric C as that described in Example 1 between the same random fine fiber web A as that described in Example 1 and a staple fiber web B having a weight of 150 g/m$^2$ and consisting of 40 parts by weight of PET staple fibers having a denier of 0.3 and a length of 5 mm and 60 parts by weight of polyvinyl alcohol stable fibers having a denier of 1.0 and a length of 5 mm, the staple fiber web B having been prepared by the paper-forming method.

The same water stream-ejecting procedures as those described in Example 1 were applied to the three layer precursory composite sheet.

The resultant composite sheet had a weight of 270 g/m$^2$, a thickness of 1.25 mm and an apparent density of 0.215 g/cm$^3$ and exhibited an extremely poor peeling strength between the random fine fiber web layer A and the plain weave fabric layer C of 0.2 kg/cm.

The composite sheet was converted into an artificial leather in the same manner as described in Example 1. The resultant artificial leather had a weight of 230 g/m$^2$ and a thickness of 0.80 mm and exhibited the properties indicated in Table 1.

TABLE 1

| Item | Example 1 | Comparative Example 1 |
|---|---|---|
| Density of fluffs on raised surface | Large | Usual |
| Writing effect | Excellent | Usual |
| Peeling strength (kg/cm) | 3.0 (A/B)<br>2.5 (B/C)<br>3.3 (C/D) | 0.25 (A/C) |
| Resistance to abrasion (rubbing times) | 20,000 | 3,000 |
| Impregnated rate of polyurethane (sec) | 15 | 120 |

Comparative Example 2

The same procedures as those described in Example 1 were carried out, except that the PET staple fibers in the staple fiber webs B and D had a length of 200 mm. The resultant composite sheet had a weight of 250 g/m$^2$, a thickness of 1.20 mm and an apparent density of 0.208 g/cm$^3$ and exhibited peeling strengthes of 0.30 kg/cm between the random fine fiber web layer A and the staple fiber web layer B, of 0.25 kg/cm between the staple fiber web layer B and the plain weave fabric layer C and of 0.21 kg/cm between the woven fabric layer C and the staple fiber web layer D.

The resultant artificial leather exhibited peeling strengthes of 0.30 kg/cm between the random fine fiber web layer A and the staple fiber web layer B, of 0.35 kg/cm between the staple fiber web layer B and the woven fabric layer C and of 0.24 kg/cm between the fabric layer C and the staple fiber web layer D and a resistance to abrasion of 4000 rubbing times.

Example 2

The same procedures as those described in Example 1 were carried out, except for the following items.

The random fine fiber web A was prepared from nylon 6 in accordance with the melt-blow method disclosed in Japanese Patent Application Laid-open No. 54-131080 (1979), consisted of extremely fine nylon 6 fibers having an average denier of 0.03 and an average length of 150 to 200 mm and had a weight of 60 g/m$^2$.

The staple fiber web B was prepared, in accordance with a paper-making process, from a mixture of 40 parts by weight of nylon 6 staple fibers having a denier of 2.0 and a length of 5 mm and 40 parts by weight of polyvinyl alcohol staple fibers having a denier of 1.0 and a length of 5 mm, and had a weight of 150 g/m$^2$.

The plain weave fabric C was prepared from nylon 6 multifilament yarns having a yarn count of 70 deniers/24 filaments, and had a weight of 50 g/m$^2$.

No staple fiber web D was used.

The resultant composite sheet had a weight of 260 g/m$^2$, a thickness of 1.30 mm, and an apparent density of 0.200 g/cm$^3$ and exhibited peeling strengthes of 3.0 kg/cm between the random fine fiber web layer A and the staple fiber web layer B and of 3.1 kg/cm between the staple fiber web layer B and the plain weave fabric layer C.

The impregnating rate of polyurethane was 25 seconds.

The dyeing procedure was carried out at a temperature of 90° C. for 40 minutes by using 15% of Acid Blue 23 (Alizarine Light Blue 4GL, made by Mitsubishi Chemical Co. Ltd.), based on the weight of the composite sheet.

The resultant artificial leather had a weight of 215 g/m$^2$ and a thickness of 0.80 mm and exhibited peeling strengthes of 4.0 kg/cm between the layer A and the layer B and of 3.9 kg/cm between the layer B and the layer C and a resistance to abrasion of 15,000 rubbing times. The touch and appearance of the surface and the softness of the artificial leather were satisfactory.

Example 3

A fine fiber web A having a weight of 50 g/m$^2$ and consisting of PET multifilaments with an average denier of 0.4, was produced in accordance with the spun-bond method by using an apparatus described in Japanese Patent Application Publication 48-38025 (1973).

The web A was superimposed on the same staple fiber web B and the same woven fabric C as those described in Example 1 and the resultant three layer precursory composite sheet was converted into a composite sheet by the same water stream-ejecting procedures as those described in Example 1. The resultant composite sheet had a weight of 170 g/m$^2$, a thickness of 0.85 mm and an apparent density of 0.200 g/cm$^3$ and exhibited peeling strengthes of 1.9 kg/cm between the web layer A and the web layer B and of 2.6 kg/cm between the web layer B and the fabric layer C.

The composite sheet was converted to an artificial leather by the same method as described in Example 1. The impregnating rate of polyurethane was 20 seconds.

The resultant artificial leather had a weight of 200 g/m$^2$ and a thickness of 0.65 mm and exhibited peeling strengthes of 2.1 kg/cm between the web layer A and the web layer B and of 2.9 kg/cm between the web layer B and the fabric layer C, and a resistance to abrasion of 21,000 rubbing times.

The writing effect on the surface and the softness of the artificial leather were satisfactory.

Example 4

A fine fiber web A having a weight of 90 g/m$^2$ and consisting of PET fine fibers, having an average denier of 0.3 and an average length of from 100 to 250 mm, was produced by flush-spinning a solution of 15% by weight of PET in trichlorofluoromethane by using the apparatus indicated in Japanese Patent Application Publication No. 44-21817 (1969).

A staple fiber web B having a weight of 100 g/m$^2$ and consisting of PET staple fibers with a denier of 0.8 and a length of 10 mm was produced by a conventional paper-forming method.

The staple fiber web B was superimposed on the same woven fabric C as that described in Example 1 and the fine fiber web A was superimposed on the staple fiber web B so as to form a three layer precursory composite sheet.

The precursory composite sheet was subjected to the same water stream-ejecting procedures as those described in Example 1. The resultant composite sheet had a weight of 250 g/m$^2$, a thickness of 1.10 mm and an apparent density of 0.228 g/cm$^3$ and exhibited peeling strengthes of 2.1 kg/cm between the web layer A and the web layer B and of 1.7 kg/cm between the web layer B and the fabric layer C.

The composite sheet was converted to an artificial leather by the same method as that described in Example 1. The impregnating rate of polyurethane was 30 seconds. The resultant artificial leather exhibited satisfactory writing effect and softness and had the following properties.

| | |
|---|---|
| Weight | 200 g/m$^2$ |
| Thickness | 0.60 mm |
| Peeling strength | 2.5 kg/cm (A/B)<br>1.8 kg/cm (B/C) |
| Resistance to abrasion | 15,000 rubbing times |

Example 5

The same procedures as those described in Example 1 were carried out, except that the staple fiber web B had a weight of 50 g/m$^2$ and consisted of 70 parts by weight of PET staple fibers with a denier of 0.2 and a length of 4 mm and 30 parts by weight of PVA staple fibers with a denier of 1.0 and a length of 3 mm, and the staple fiber web D had a weight of 100 g/m$^2$ and consisted of 70 parts by weight of the same PVA staple fibers as described above and 30 parts by weight of the same PET staple fibers as described above.

The resultant composite sheet had the following properties.

| | |
|---|---|
| Weight | 290 g/m$^2$ |
| Thickness | 1.30 mm |
| Apparent density | 0.223 g/cm$^3$ |
| Peeling strength | 3.5 kg/cm (A/B) |
| | 3.8 kg/cm (B/C) |
| | 4.3 kg/cm (C/D) |

The composite sheet was converted to an artificial leather by the same method as that described in Example 1. The impregnating rate of polyurethane was 15 seconds. The resultant artificial sheet exhibited the following properties:

| | |
|---|---|
| Weight | 230 g/m$^2$ |
| Thickness | 0.85 mm |
| Peeling strength | 4.0 kg/cm (A/B) |
| | 4.2 kg/cm (B/C) |
| | 4.7 kg/cm (C/D) |
| Resistance to abrasion | 20,000 rubbing times |
| Writing effect | satisfactory |
| Softness | satisfactory |

Example 6

The same procedures as those described in Example 1 were carried out, except that the fabric C consisted of a tricot knitted fabric having a weight of 40 g/m$^2$ and consisted of PET multifilament yarns having a yarn count of 50 deniers/36 filaments and no staple fiber web D was used.

The composite sheet had the following properties:

| | |
|---|---|
| Weight | 180 g/m$^2$ |
| Thickness | 0.90 mm |
| Apparent density | 0.200 g/cm$^2$ |
| Peeling strength | 2.6 kg/cm (A/B) |
| | 2.3 kg/cm (B/C) |

The composite sheet was converted to an artificial leather by the same method as that described in Example 1. The impregnating rate of polyurethane was 20 seconds. The resultant artificial leather had the following properties:

| | |
|---|---|
| Weight | 210 g/m$^2$ |
| Thickness | 0.70 mm |
| Peeling strength | 2.9 kg/cm (A/B) |
| | 2.4 kg/cm (B/C) |
| Resistance to abrasion | 15,000 rubbing times |
| Writing effect | satisfactory |
| Softness | satisfactory |

What is claimed is:

1. A multilayer composite sheet useful as a substrate for artificial leather, comprising at least three fibrous layers, namely, a superficial layer (A) consisting of spun-laid extremely fine fibers having an average denier of 0.5 or less, which fine fibers are three dimensionally entangled with each other, thereby forming a body of a non-woven fibrous layer; an intermediate layer (B) consisting of synthetic staple fibers having a length of 50 mm or less, which staple fibers are entangled with each other to form a body of a non-woven layer; and a base layer (C) consisting of a woven or knitted fabric, said superficial layer (A), said intermediate layer (B) and said base layer (C) being superimposed together in the above-mentioned order and being subjected to needle-punching or water-stream-ejecting under high pressure thereby to form a composite sheet wherein a portion of the fibers in each non-woven fibrous layer penetrates into the inside of the adjacent layers and said penetrated fibers become entangled with the fibers in the adjacent layers.

2. The composite sheet as claimed in claim 1, wherein said extremely fine synthetic fibers in said superficial layer (A) are produced by a melt-blow method.

3. The composite sheet as claimed in claim 1, wherein said intermediate layer (B) is produced by a paper-forming procedure and a subsequent entangling procedure.

4. The composite sheet as claimed in claim 1, wherein a back surface layer (D), consisting of synthetic staple fibers entangled together and having a length of 50 mm or less, is placed on the lower surface of the base layer (C) and is incorporated into said three fibrous layers, in such a manner that a portion of the fibers in the back surface layer (D) penetrates into the base layer (C) or into the other non-woven fibrous layers through the base layer (C) and said penetrated fibers become entangled with the fibers in the base layer (C) or in the other non-woven fibrous layers.

5. The composite sheet as claimed in claim 4, wherein said back surface layer (D) is produced by a paper-forming procedure and a subsequent entangling procedure.

* * * * *